US010157592B2

(12) United States Patent
Ip et al.

(10) Patent No.: US 10,157,592 B2
(45) Date of Patent: Dec. 18, 2018

(54) OPTIMIZING LIGHT OUTPUT PROFILE FOR DUAL-MODULATION DISPLAY PERFORMANCE

(71) Applicant: Dolby Laboratories Licensing Corporation, San Francisco, CA (US)

(72) Inventors: Henry Hang-Kei Ip, Richmond (CA); Chun Chi Wan, Mountain View, CA (US); Ka Wing Terence Lau, Burnaby (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/683,213

(22) Filed: Aug. 22, 2017

(65) Prior Publication Data

US 2017/0352330 A1 Dec. 7, 2017

Related U.S. Application Data

(62) Division of application No. 13/678,372, filed on Nov. 15, 2012, now Pat. No. 9,747,866.

(Continued)

(51) Int. Cl.
*G06F 1/00* (2006.01)
*G09G 5/10* (2006.01)
(Continued)

(52) U.S. Cl.
CPC ............ *G09G 5/10* (2013.01); *G09G 3/3406* (2013.01); *G09G 3/006* (2013.01);
(Continued)

(58) Field of Classification Search
CPC ....... G09G 2360/16; G09G 2320/0233; G09G 2320/0646; G09G 3/32; G09G 3/3426; G09G 3/3406
See application file for complete search history.

(56) References Cited

U.S. PATENT DOCUMENTS 5,664,158 A 9/1997 Larimer
7,469,202 B2 * 12/2008 Dowski, Jr. ........ G02B 27/0012 359/563

(Continued)

FOREIGN PATENT DOCUMENTS

WO 2006/010244 2/2006
WO 2010/056618 5/2010
WO 2011/028335 7/2010

OTHER PUBLICATIONS

Seetzen, Helge. "High Dynamic Range Display and Projection Systems", A Thesis submitted in partial fulfillment of the Requirements for the Degree of Doctor in Philosophy in Faculty of Graduate Studies UBC. Apr. 2009, Vancouver, BC, Canada.

*Primary Examiner* — Michael Faragalla

(57) ABSTRACT

Techniques for optimizing light output profiles in display systems are described. A light output profile is defined in relation to a plurality of sample locations on an illuminated surface. Point spread functions that satisfy illumination performance values specified in the light output profile in aggregate are computed or derived. A design process that adds or removes optical components to a display light assembly derives an optimal design of a light illumination layer for display systems. Relationships and parameter values determined in the design process may be configured into display systems along with the optical components for the purpose of generating optimized light output profiles in the display systems.

20 Claims, 12 Drawing Sheets

Related U.S. Application Data

(60) Provisional application No. 61/562,946, filed on Nov. 22, 2011.

(51) Int. Cl.
*G09G 3/34* (2006.01)
*G09G 3/00* (2006.01)

(52) U.S. Cl.
CPC .............. *G09G 2320/0233* (2013.01); *G09G 2320/048* (2013.01); *G09G 2320/062* (2013.01); *G09G 2320/0693* (2013.01)

(56) References Cited

U.S. PATENT DOCUMENTS

| | | | |
|---|---|---|---|
| 7,602,369 | B2 | 10/2009 | Feng |
| 7,817,131 | B2 | 10/2010 | Seetzen |
| 8,174,546 | B2 | 5/2012 | Whitehead |
| 8,217,970 | B2 | 7/2012 | Whitehead et al. |
| 8,471,807 | B2 | 6/2013 | Seetzen |
| 8,531,353 | B2 | 9/2013 | Heidrich |
| 8,537,098 | B2 | 9/2013 | Atkins |
| 9,341,887 | B2 | 5/2016 | Whitehead |
| 2010/0007577 | A1 | 1/2010 | Ninan |
| 2010/0214282 | A1 | 8/2010 | Whitehead |

* cited by examiner

OPTIMIZING LIGHT OUTPUT PROFILE FOR DUAL-MODULATION DISPLAY PERFORMANCE

CROSS REFERENCE TO RELATED APPLICATIONS

This application is a division of U.S. patent application Ser. No. 13/678,372 (now U.S. Pat. No. 9,747,866), filed 15 Nov. 2012 by at least one common inventor, which claims the benefit of and priority to U.S. Provisional Patent Application No. 61/562,946 filed 22 Nov. 2011, all of which are incorporated by reference herein in their entireties.

TECHNOLOGY

The present invention relates generally to display systems, and in particular, to optimizing light output profiles in display systems.

BACKGROUND

To render images, a display system may use light valves and light emitters to regulate brightness levels and color values of pixels on a viewing surface of a (e.g., LCD) display panel. Typically, light emitters such as fluorescent lights or light-emitting diodes illuminate pixels on the inner surface of a display panel. The light illuminating the pixels is attenuated by RGB color filters and liquid crystal materials in the display panel to form images on the outer surface, e.g., the viewing surface, of the display panel.

It is often difficult for a display system to support a high spatial resolution, a high dynamic range and a wide color gamut at the same time. To support a high dynamic range, light emitters in a display system may be configured to emit high intensity light within a small designated portion of an illuminated surface. Artifacts such as a grainy illumination pattern may be visible to a viewer. Moreover, high intensity light is difficult to be confined within a small designated portion and typically bleeds into neighboring portions on an illuminated surface, causing additional visible artifacts (e.g., halos), a raise of dark level, reduction of maximal contrast ratios, and incorrect color expressions. These problems in turn limit the dynamic range and the color gamut that the display system is able to support.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
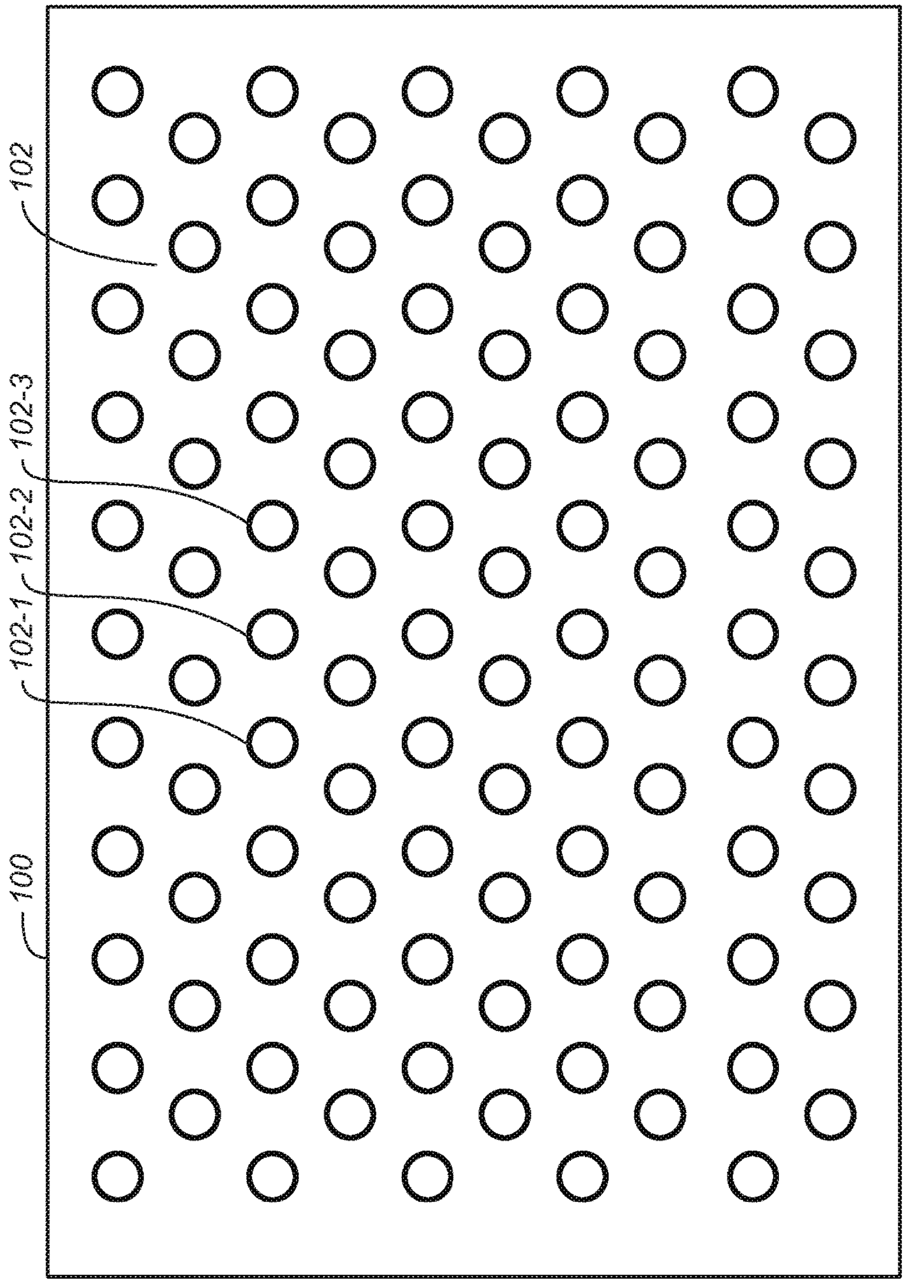
FIG. 1A and FIG. 1B illustrate spatial distributions of a plurality of sample locations on an illuminated surface in a display device, in accordance with some example embodiments.

Example embodiments, which relate to optimizing light output profile in display systems, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. General Overview
2. Light Output Profile
3. Example Optical Components
4. Point Spread Functions
5. High-Performance Display Light Design Process
6. Display Process Flow
7. Implementation Mechanisms—Hardware Overview
8. Equivalents, Extensions, Alternatives and Miscellaneous

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques are provided for optimizing light output profiles in a wide variety of display systems. A display system may comprise an N-modulation architecture that has N light modulation layers, where N represents an integer greater than one. When N is equal to two (2), the display system becomes a dual modulation display system. Illumination or light irradiation in the display system may source from various types of light emitters such as light emitting diodes, fluorescent lights, organic-light-emitting diodes, quantum-dot based light sources, etc.

In some embodiments, a display system as described herein comprises at least one light illumination layer through which illumination on an illuminated surface may be locally modulated on the illuminated surface. For example, on the illumination surface, a part in association with a sunny portion of a scene may be illuminated with maximum illumination, while another part in association with a shadow portion of the same scene may be concurrently illuminated with low illumination. A light illumination layer as described herein may be implemented with various types of light emitters and other optical components.

In some embodiments, a display light design system may be used to test out different combinations of optical components and/or different parameter values of the optical components for a light illumination layer under design. A light output profile may be specified for the light illumination layer under design. The light output profile may emphasize one or more design objectives for the light illumination layer. In an example, a light output profile may emphasize highest contrast ratios under system constraints (implementation cost, display device size, display device geometry, viewing conditions, display applications, etc.). In another example, a light output profile may emphasize display light efficiencies. In a further example, a light output profile may emphasize a uniform distribution while achieving high contrast performance. In an example, a light output profile may emphasize a particular shape with specific transition characteristics between a central peak of a point spread function to a tail of the point spread function. In another example, a light output profile may emphasize a small size for a point spread function for the purpose of supporting high performance display applications on a small screen device. In a further example, a light output profile may be specified to support displaying small bright features. Other examples of light output profiles may include, but are not limited to, any of those emphasizing supports for display applications in a wide variety of viewing conditions such as bright viewing conditions, theater viewing conditions, etc.

A wide range of candidate point spread functions may satisfy illumination performance values required by a light output profile. Optimal point spread functions may be selected from the candidate point spread functions based on criteria relating to shapes, central peak characteristics, trail characteristics, overlapping with other point spread functions, and other properties of point spread functions.

Various sensors including, but not limited to, light sensors may be used by a display light design system as described herein to measure point spread functions with various test images or patterns and to refine the optical design of a light illumination layer under design. An optical component may be added to, or removed from an assembly of optical components for the light illumination layer under design, depending on whether the optical component helps meet, or adversely affects the realization of, illumination performance values specified by the light output profile.

Shapes and other properties of point spread functions that collectively (or in aggregate) constitute a light output profile may be controlled and optimized by setting selected values to optical parameters of the optical components that generate the point spread functions.

Once the assembly of optical components for the light illumination layer under design is finalized, the assembly may be implemented for a (runtime) light illumination layer in a (runtime) display device. Value ranges (continuous or discrete values) of runtime configurable parameters of one or more optical components for the runtime light illumination layer may be configured in the runtime display device based on one or more relationships between the runtime configurable parameters and the light output profile as determined/measured by the display light design system.

At runtime, a light illumination layer may be driven by a version (e.g., relatively low resolution) of received image data derived from a full resolution version of the received image data and may spread light into a full display area such as a rendering surface of the display system.

In some embodiments, mechanisms as described herein form a part of a display system, including but not limited to a handheld device, game machine, television, laptop computer, netbook computer, cellular radiotelephone, electronic book reader, tablet computer, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Light Output Profile

Figure 1B:
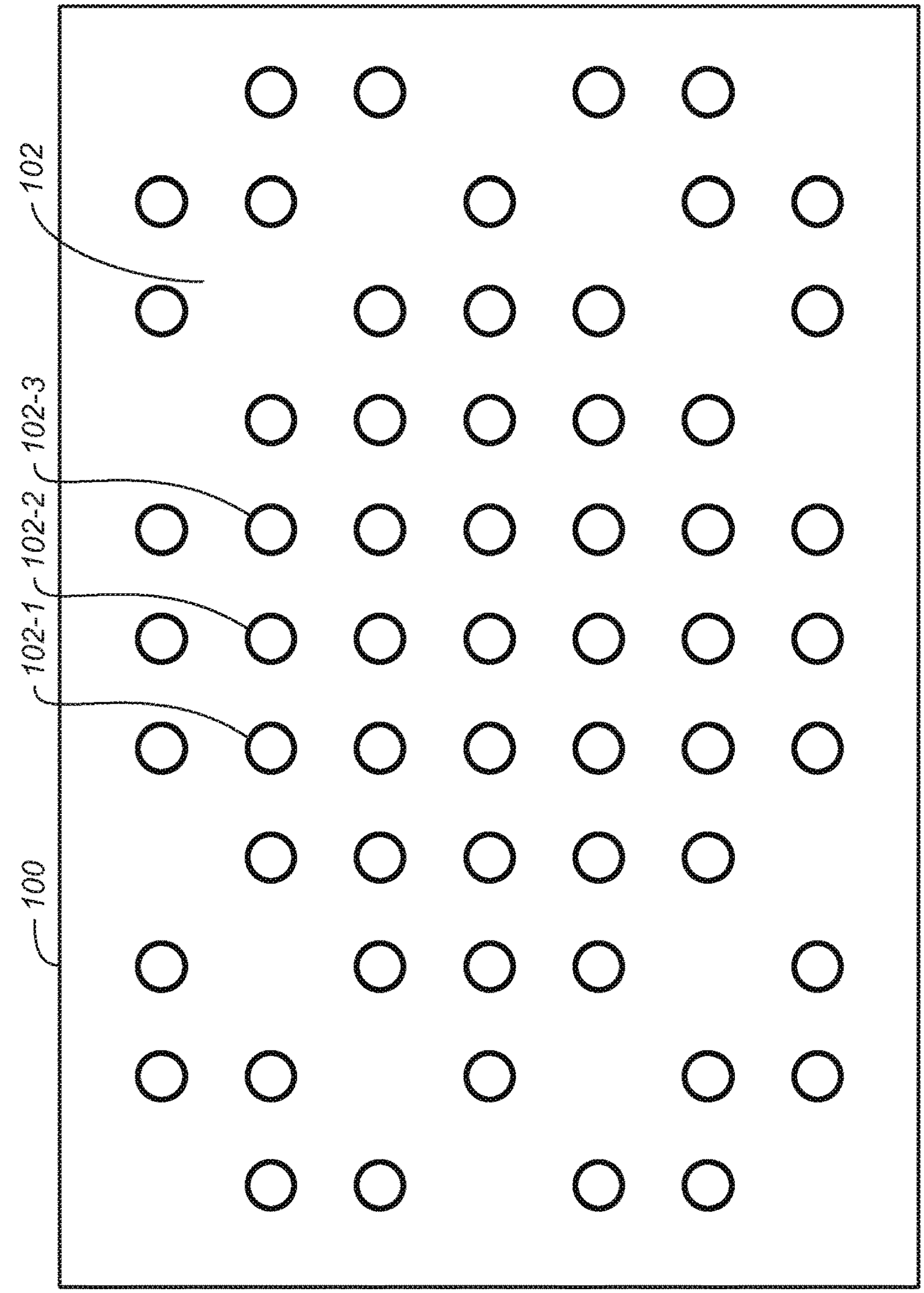

FIG. 1A and FIG. 1B illustrate spatial distributions of a plurality of sample locations (102) on an illuminated surface (100) in a display device, in accordance with some example embodiments. An example of display devices includes, but is not limited to, LCD display devices. A display device as described herein may comprise two or more light modulation layers. Examples of light modulation layers may include one or more light illumination layers and one or more light valve layers. Each light modulation layer may be separately driven, for example, by corresponding control data derived from image data. A light illumination layer may comprise light emitters and other optical components to irradiate light to spatial locations such as the illumination surface (100). A light valve layer may comprise a plurality of light valves arranged in a specific pattern; one or more of such valves may constitute a pixel for the display device. Transmittance and/or reflectance properties of each light valve in a light valve layer as described herein may be controlled based at least in part on a pixel value that is to be expressed by a pixel that includes the light valve. A light valve layer may be driven by control data with a spatial resolution up to a full resolution supported by the display device.

In an example embodiment, the display device is a dual modulation display device in which a light illumination layer may be driven by a coarser spatial resolution control data (e.g., comprising average values for a group of pixels) derived from image data, while a light valve layer may be driven by a finer spatial resolution control data (e.g., comprising a component value for a sub-pixel within a pixel) derived from the image data.

The illuminated surface (100, which may be the same as 202 of FIG. 2A in some embodiments) may be an inner surface (away from a viewer who views the display device in a normal viewing direction) of a light valve layer. Light incident on the illuminated surface (100) forms a light field.

Under techniques as described herein, a light output profile may be specified relative to the plurality of sample locations (102). In some embodiments, as illustrated in FIG. 1A, the plurality of sample locations may be evenly (e.g., uniformly) distributed over the illuminated surface (100). In some other embodiments, as illustrated in FIG. 1B, the plurality of sample locations may be non-uniformly distributed over the illuminated surface (100); for example, a salient area such as a central area (a circle, an ellipse, a polygon, a perceptually prominent area, etc.) on the illuminated surface (100) may comprise a higher density of sample locations than other areas of the illuminated surface (100).

In some embodiments, a sample location as described herein may represent a point on the illuminated surface (100). In some embodiments, a sample location as described herein may represent a portion (e.g., a small area) of the illuminated surface (100). In some embodiments, light incident on a portion of the illuminated surface (100) at a sample location provides light for light valves (each of which may be a pixel, a sub-pixel, or a group of pixels) corresponding to the portion of the illuminated surface (100). To render one or more image frames based on image data, the light received by the light valves may be further modulated by light valves based on control data derived from the image data.

The light output profile may comprise one or more illumination performance values for each (e.g., 102-1, 102-2, or 102-3) of the plurality of sample locations (102). In some embodiments, performance values specified for one sample location (e.g., 102-1) may be the same performance values as specified for another sample location (e.g., 102-2 or 102-3), or equals performance values as specified for another sample location (e.g., 102-2 or 102-3). In some embodiments, the illumination performance values are specified based on design objectives and/or constraints relating to one or more types of display devices.

Given a light output profile specified in relation to a plurality of sample locations, a very large number of candidate point spread functions may satisfy illumination performance values specified in the light output profile. In some embodiments, a point spread function may refer to one or more smallest individually controllable spatial distributions of illumination on an illuminated surface (e.g., 100). A point spread function may be represented by an analytic function, or numerically simulated/computed. In an example, a point spread function is a single smallest individually controllable spatial distribution of illumination on an illuminated surface (e.g., 100). A point spread function may be characterized by a spatial distribution of relative luminance intensity (e.g., an integration of the point spread function over the illuminated surface may be normalized to a set value). A point spread function may also be characterized by a spatial distribution of an absolute (e.g., physical, measurable in units of $cd/m^2$) luminance intensity (e.g., a spatial distribution of maximum luminance intensity, minimum luminance intensity, average luminance intensity, etc.).

In some embodiments, optimal point spread functions may be identified among the candidate point spread functions based on one or more criteria. The one or more criteria may include the implementation costs, how well (how uniform the light illumination is within a designated geometric shape, how large the light illumination is outside the designated geometric shape, etc.) a point spread function performs relative to meeting the performance illumination values specified in the light output profile. The one or more criteria may weigh differently, depending on the importance of an individual criterion. In an example embodiment, maximizing contrast ratios is the most important criterion. In another example embodiment, minimizing visible artifacts (e.g., halos) is the most important criterion. In a further example embodiment, maximizing contrast ratios and minimizing visible artifacts are comparably important.

Some display devices may be used to support display applications for high resolution image rendering with standard dynamic range and standard color gamut in a bright viewing environment. A light output profile specified for such display devices may comprise illumination performance values for a standard contrast ratio range, a high maximum luminance value, a high dark level, uniform spatial distribution of illumination, etc. Optimal point spread functions (e.g., high intensity light emitters with relatively flat point spread functions) may be defined or computed to meet, or at least approximate, the required illumination performance values in the light output profile.

Some display devices may be used to support display applications for high resolution image rendering with high dynamic range and wide color gamut in a dark viewing environment. A light output profile specified for such display devices may comprise illumination performance values for a high contrast ratio range, a high maximum luminance value, a low dark level, well demarcated, individually controllable luminance in designated illumination areas for each point spread function, etc. Optimal point spread functions (e.g., high intensity light emitters with relatively flat point spread functions) may be defined or (numerically) computed to meet, or at least approximate, the required illumination performance values in the light output profile.

In some embodiments, a light emitter as described herein comprises one or more optical components that may be optically and/or electrically stimulated or excited to emit light.

3. Example Optical Components

A point spread function may be implemented by a plurality of optical components. A point spread function may be realized using a single light emitter. Additionally, optionally, or alternatively, a point spread function may be realized using more than one light emitter. Additionally, optionally, or alternatively, a single light emitter may be used to provide light to more than one point spread function, for example, through light redirectors or light guides.

Some optical components (e.g., a specific diffuser for the entire area of an illuminated surface) may be shared by all point spread functions. Some optical components (e.g., a specific reflector erected between two neighboring light emitters) may be shared. Some optical components (e.g., a specific color light emitter) may be dedicated to a point spread function.

Figure 2A:
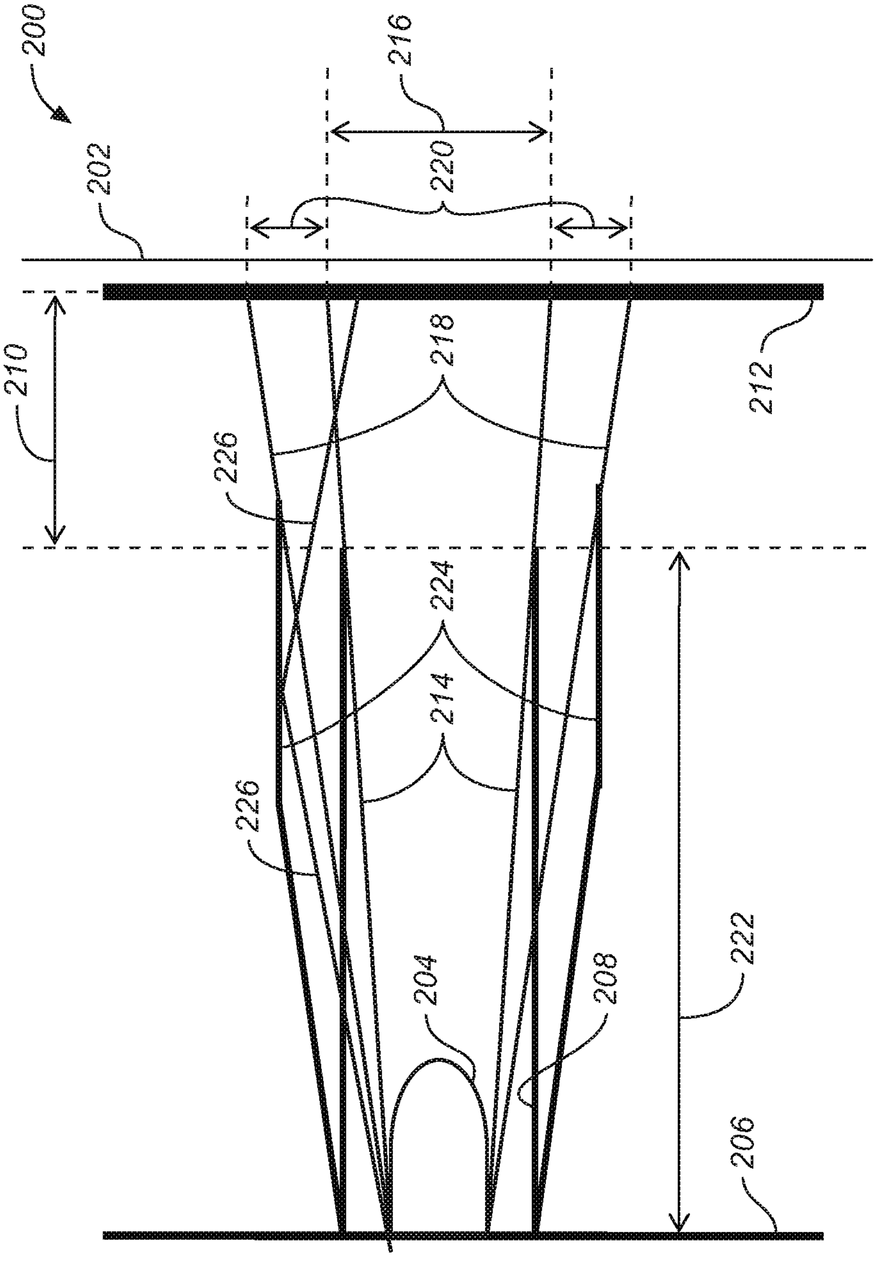
FIG. 2A illustrates a cross-sectional view of a light illumination unit to generate a point spread function on an illuminated surface, in accordance with an example embodiment.

FIG. 2A illustrates a cross-sectional view of a light illumination unit 200 to generate a point spread function on an illuminated surface (202), in accordance with an example embodiment. In the illustrated embodiment, a light emitter 204 is mounted on a circuit board 206 and centrally placed at one end of a reflector assembly 208, which may also be mounted to or structurally attached to the circuit board 206. The reflector assembly 208 may be partly reflective and partly transmissive. In some embodiments, the reflectance and transmittance of a reflector assembly 208 may be actively controlled at runtime. It should be noted that one or more of the illustrated components, including but not limited to the reflector assembly 208, are optional and may not be used in some embodiments.

In this illustrated embodiment, there is a spatial gap 210 between the other end, an opening, of the reflector assembly 208 and an inner surface (on the side of the light emitter 204) of a diffuser 212. Through the opening of the reflector assembly 208, light 214 from the light emitter 204 illuminates a central portion 216 on the first surface of the diffuser 212. Through the walls of the reflector assembly 208, light 226 from the light emitter element 204 may be reflected by a reflector 206 onto the first surface of the diffuser 212. Through the walls of the reflector assembly 208, light 218 from the light emitter element 204 may illuminate a remainder portion 220 on the first surface of the diffuser 212. As illustrated, the distance between the inner surface of the diffuser 202 and the circuit board 106 may approximately be the sum of a length 222 of the reflector assembly 208 and the spatial gap 210.

The reflector assembly 208 may further comprise a totally reflective wall 224. In this example embodiment, the totally reflective wall 224 reflects a part of light 226 passed through a part-reflective-part-transmissive wall of the reflective assembly 208 onto the inner surface of the diffuser 212. This increases illumination on the assigned portion 216.

Figure 2B:
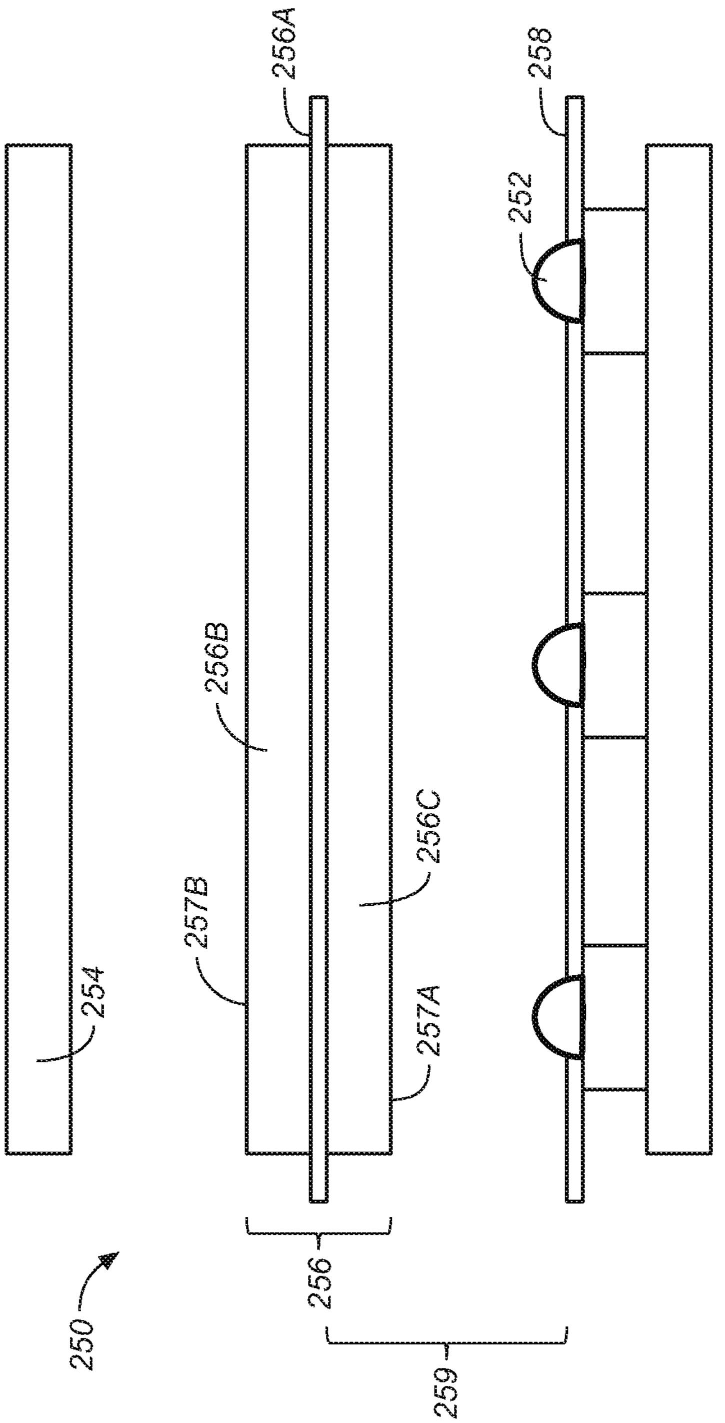
FIG. 2B illustrates a display system, according to an example embodiment.

FIG. 2B illustrates a display system 250, according to an example embodiment. Display system 250 comprises light source components such as a backlight unit 252 and a light valve layer 254 (e.g., one or more LCD panels). Light valve layer 254 may comprise an array of pixels which are controllable to vary the amount of incident light that is transmitted by light valve layer 254. In some embodiments a pixel as described herein comprises individually controllable color sub-pixels.

A light illumination layer may comprise backlight unit 252 and a light control layer 256. Light control layer 256 is located between backlight unit 252 and light valve layer 254. Light from backlight unit 252 passes through light control layer 256 to reach light valve layer 254. Light control layer has a back side 257A facing toward backlight unit 252 and a front side 257B facing toward light valve layer 254.

In this example embodiment, light control layer 256 comprises a layer 256A of an enhanced specular reflector (ESR). The ESR layer 256A may comprise a multilayer dielectric film that reflects and transmits light over substantially all visible wavelengths and at a wide range of angles of incidence with low absorption. ESR layer 256A may comprise a highly reflective ESR film that reflects a substantial proportion of visible light. ESR film is commercially available from 3M Electronic Display Lighting Optical Systems Division of St. Paul, Minn., USA under the brand name Vikuiti™. An ESR layer, if standing on its own in air, may be reflective over the entire visible spectrum regardless of the angle of incidence.

ESR layer 256A may be thin or thick. For example, an ESR film suitable for application in an embodiment as shown in FIG. 2B may have a thickness of 65 μm.

Light control layer 256 also comprises at least one layer of a transparent or translucent material having an index of refraction that is greater than that of air (e.g., greater than 1) and is in optical contact with ESR layer 256A. In the illustrated embodiment, light control layer comprises both a front layer 256B and a rear layer 256C. Other embodiments have only one of layers 256B or 256C. One or more of layers 256B and 256C may be diffusion layers.

Due to the presence of layers 256B and/or 256C, light control layer 256 has a reflectivity significantly lower than ESR layer 256A would have if standing on its own in air. Layers 256B and/or 256C act to reduce the reflectivity of ESR layer 256A. Layers 256B and/or 256C may comprise, for example, suitable plastics such as polycarbonates, Poly (methyl methacrylate) (e.g. Plexiglas™), acrylics, polyurethane, birefringent polyester, isotropic polyester and syndiotactic polystyrene.

Layers 256B and 256C may be made out of suitable glasses, or other materials that are substantially clear or translucent to wavelengths of light in the visible range.

The thicknesses of layers 256B and 256C may be varied. In some embodiments, layers 256B and 256C have thicknesses in excess of ½ mm (500 μm). For example, in an example embodiment, layers 256B and 256C have thicknesses in the range of 1 mm to 5 mm. In some cases, layers 256B and 256C are significantly thicker than ESR layer 256A. For example, one or both of layers 256B and 256C may have a thickness that is at least 5 times that of a thickness of ESR layer 256A.

As shown in FIG. 2B, display system 250 comprises a reflector 258 at or behind backlight unit 252. Reflector 258 may, for example, comprise an ESR layer or a diffuse scatterer such as a suitable white ink or white paint. An optical cavity 259 is defined between reflector 258 and layer 256A of light control layer 256. 5 In the illustrated embodiment, light is emitted by backlight unit 252 toward light control layer 256. At light control layer 256, some of the light is reflected and some of the light is transmitted. The transmitted light passes to light valve layer 254. Reflected light passes to reflector 258 and is recycled by being reflected back toward light control layer 256.

In some embodiments, backlight unit 252 comprises a plurality of individually controllable light emitters. The light emitters may be arranged such that the amount of light emitted by backlight unit 252 can be made to vary from location to location across backlight unit 252 by controlling the amounts of light emitted by different ones of the individually-controllable light emitters. Providing a light control layer 256 as described herein can provide special advantages in some embodiments that also have a locally controllable backlight unit 252.

The reflectivity of light control layer 256 may be controlled by choosing an appropriate material for layers 256B and 256C (or one of these layers if the other is not present). A main parameter that affects the reflectivity of light control layer 256 is the index of refraction of the material of layers 256B and 256C that is in optical contact with ESR layer 256A. The reflectivity of light control layer 256 may be controlled to adjust the point spread function of light from backlight unit 252 that emerges from layer 256. In general, the higher the reflectivity of layer 256, the more layer 256 will broaden the point spread function of light from backlight unit 252. Increased broadening may be desirable, for example, where backlight unit 252 comprises a relatively sparse array of LEDs and where backlight unit 252 comprises LED that output light over a narrow angular aperture.

The construction of light control layer 256 may be varied in a number of ways. These include whether one, or the other, or both of layers 256B and 256C are present, the relative thicknesses of layers 256B and 256C (in some embodiments, layer 256B is thicker than layer 256C), the materials of which layers 256B and 256C are made (it is not mandatory that layers 256B and 256C, if both present, be made of the same material), the refractive indices of layers 256B and/or 256C (it is not mandatory that layers 256B and 256C, if both present, have the same index of refraction), the construction of ESR layer 256A (in some embodiments, ESR layer 256A is constructed to provide a reflectivity of less than 96% in the absence of layers 256B and 256C), the number of ESR layers present in light control layer 256, the spacing between refraction layer 256B and light valve layer 254 may be eliminated or increased to provide control over the spread of light incident on light valve layer 254, the presence or absence of surface-relief holographic diffuser elements on surfaces of layers 256B and/or 256C, and the presence or absence of scattering centers in layers 256B and/or 256C and, in embodiments where such scattering centers are present, the nature of the scattering centers and their distribution in three dimensions within the layer 256B and/or 256C.

Scattering centers in layers 256B and/or 256C may comprise, for example, one or more of particles of any suitable pigment, the pigment may comprise TiO2, for example, refractive light scatterers such as small glass beads or other refractive light scatterers (in some embodiments the refractive light scatterers comprise, for example, a high refractive index glass and/or a material having an index of refraction of at least 1.6 or at least 1.7), dislocations, bubbles or other discontinuities of the material of layers 256B and 256C and the like.

Scattering centers may range in size from, for example, nanometers to 100 micrometers. In some embodiments the scattering centers are Lambertian or nearly so. In alternative embodiments the scattering centers may be ansiotropic scatterers. In some embodiments the anisotropic scatterers are oriented such that they scatter light traveling in certain preferred directions more than light traveling in other directions and/or tend to scatter light more in some directions than in others. For example, in some embodiments, anisotropic scatterers are oriented such that they tend to scatter light more in the direction of valves 254 than in the direction of reflector 258 or directions generally parallel to the plane of layer 256.

4. Point Spread Functions

Figure 3A:
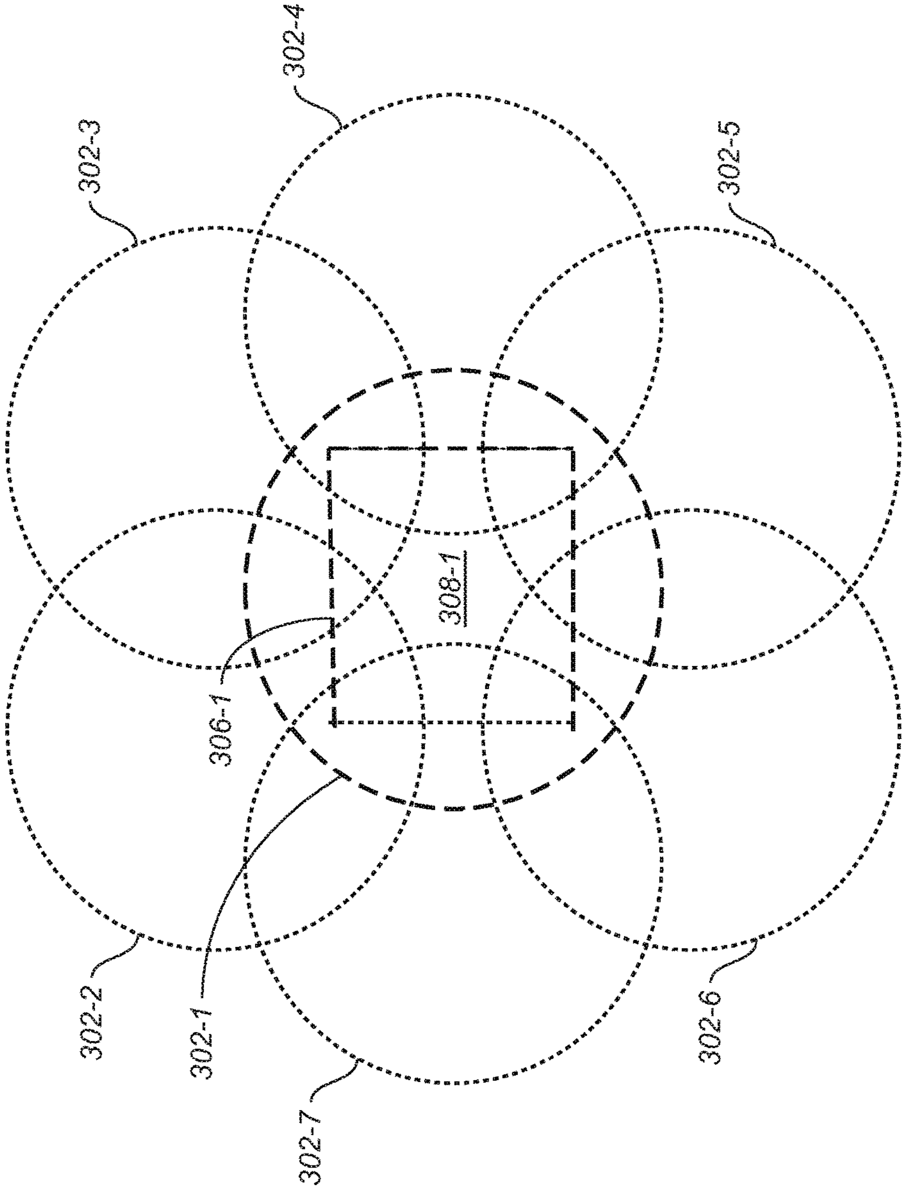
FIG. 3A illustrates point spread functions in a plan view of an illuminated surface, in accordance with an example embodiment.

FIG. 3A illustrates point spread functions (302-1 through 302-7) in a plan view of an illuminated surface (e.g., 100 of FIG. 1A or FIG. 1B), in accordance with an example embodiment. For the purpose of illustration only, the point spread functions (302-1 through 302-7) may be represented by circular shapes. As shown in FIG. 3A, a point spread function such as 302-1 may be surrounded by a plurality of neighboring point spread functions (302-2 through 302-7). Light from the plurality of neighboring point spread functions may leak into a central rectangular portion 306-1 designated to be illuminated by the point spread function 302-1. Likewise, non-central portions (outside the central rectangular portion 306-1) of the point spread function 302-1 may leak into designated portions of the neighboring point spread functions (302-2 through 302-7). As illustrated, only a portion 308-1 in the point spread function 302-1 is entirely illuminated by the point spread function 302-1 itself, while several portions in the point spread function 302-1 are illuminated by more than two point spread functions.

Different types of optical components may be used to shape a point spread function (which may assume a shape other than the circular shape illustrated in FIG. 3A). In some embodiments, overlapping portions of neighboring point spread functions may be increased to provide uniformity of illumination and high luminance intensity. In some other embodiments, overlapping portions of neighboring point spread functions may be decreased to provide support for high dynamic range.

Figure 3B:
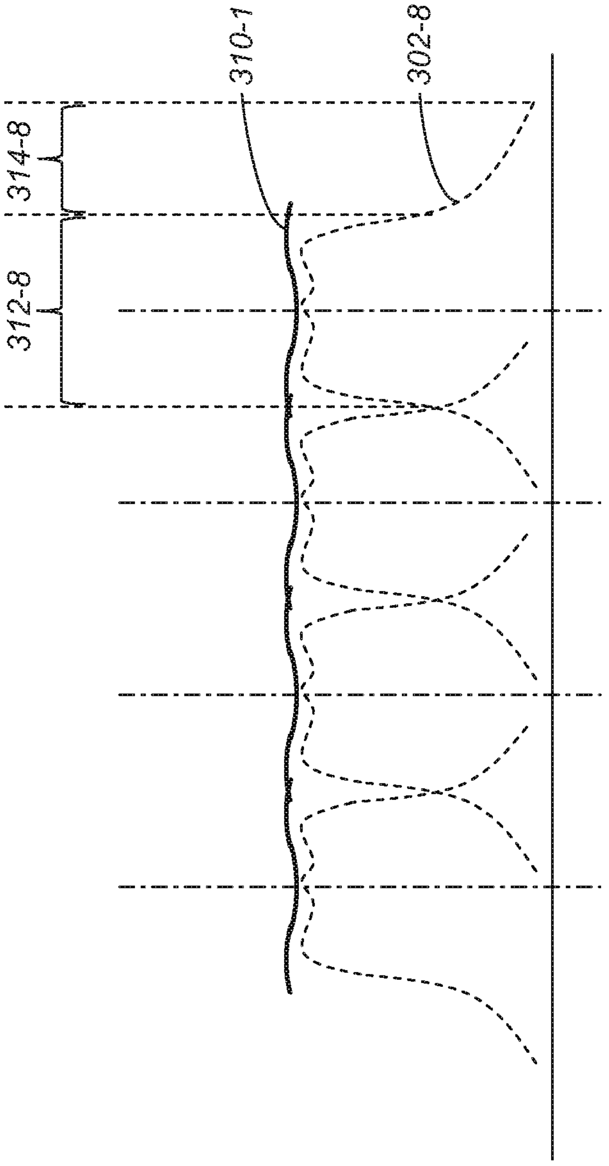
FIG. 3B and FIG. 3C illustrate light fields formed by point spread functions, in accordance with some example embodiments.
Figure 3C:
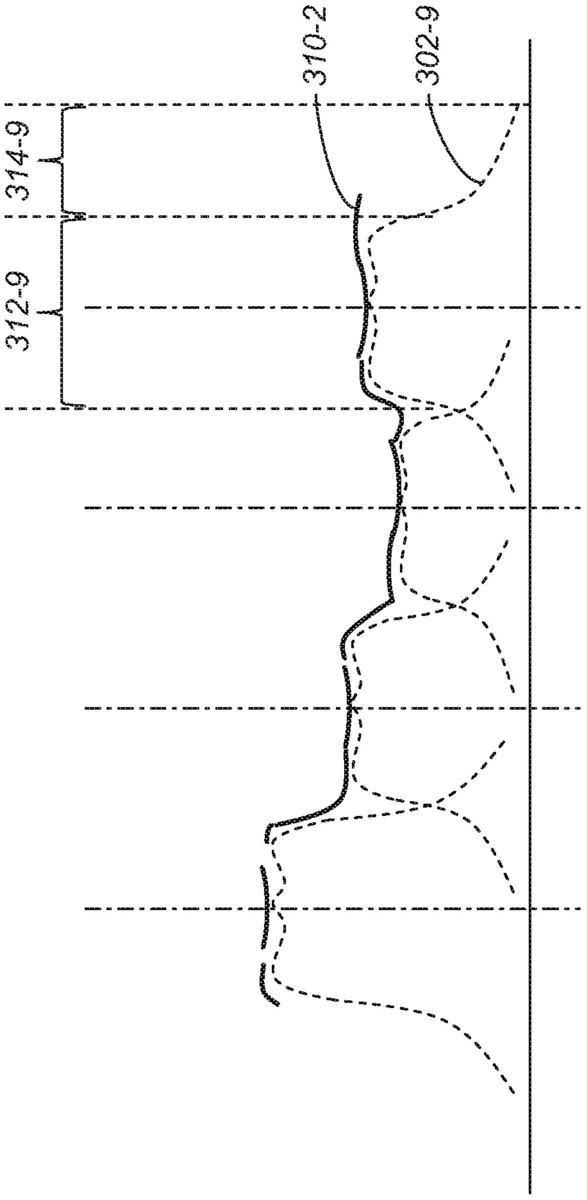
Figure 3D:
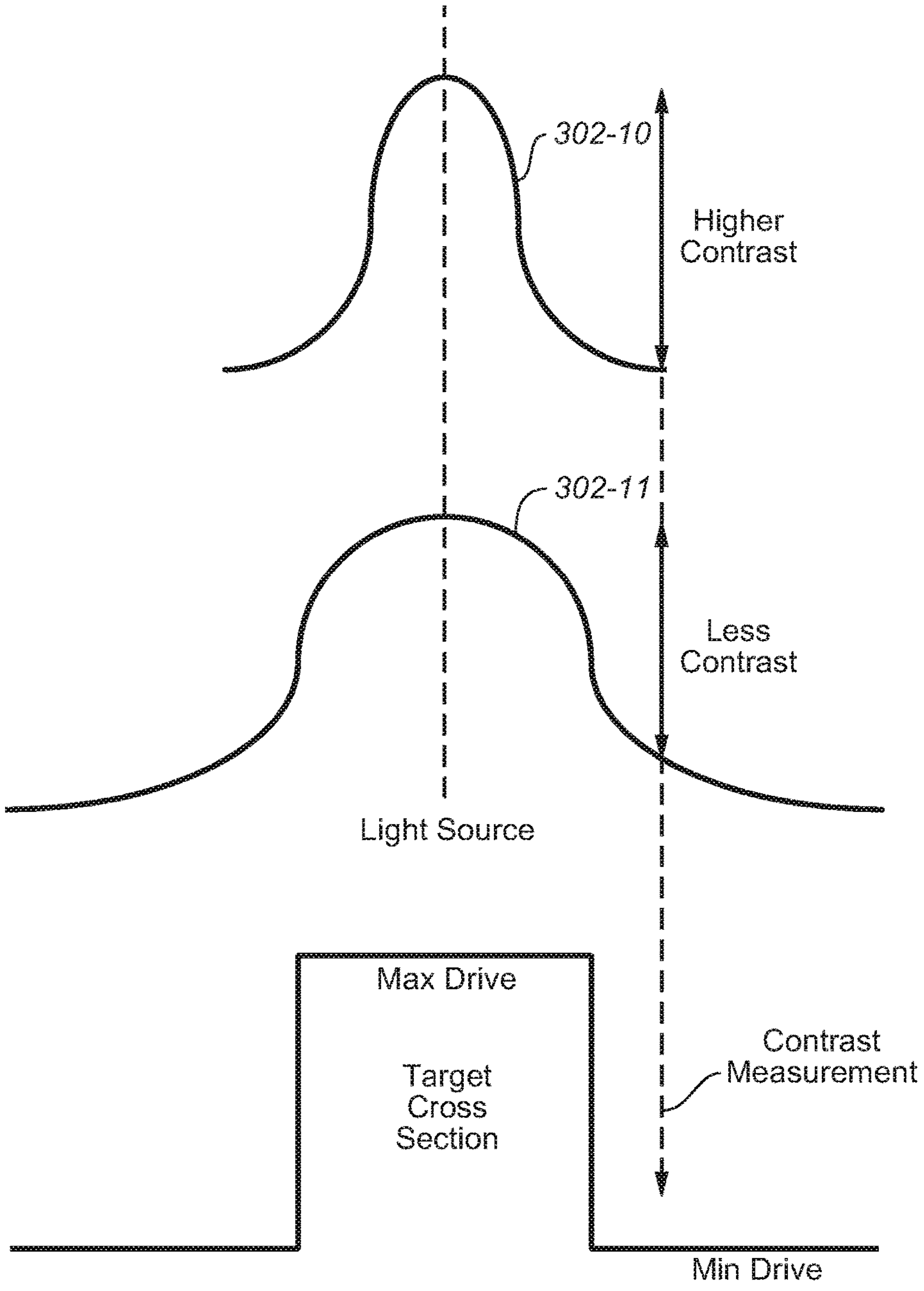
FIG. 3D illustrates effects of suppressing tails in PSF functions on contrast ratios, in accordance with some example embodiments.

FIG. 3B and FIG. 3C illustrate light fields (310-1 and 310-2) formed by point spread functions (e.g., 302-8 and 302-9), in accordance with some example embodiments. The vertical axis represents luminance values (amplitudes), while a horizontal axis represents a spatial dimension of an illuminated surface (e.g., 100 of FIG. 1A or FIG. 1B). Light in the light fields (310-1 and 310-2) over the illuminated surface (100) may vary smoothly or discontinuously. Additionally, optionally, or alternatively, light in the light fields (310-1 and 310-2) over the illuminated surface (100) may be distributed in uniformity or not in uniformity. In the light fields (310-1 and 310-2), the luminance intensity at any point on the illuminated surface (100) at a given time is the sum of the light reaching that point from all light emitters at the given time. A point spread function (e.g., 302-8 or 302-9) may comprise a central peak (312-8 or 312-9) and a tail (314-8 or 314-9). In some embodiments, each point spread function (e.g., 302-8 or 302-9) is generated by a corresponding light emitter. In FIG. 3B, all of the light emitters that generate the point spread functions are being operated at the same output level. In FIG. 3C, the output levels of the light emitters have been reduced. From FIG. 3B, it can be seen that softening central peaks (which comprises the central peak 312-8 of the point spread function 302-8) of point spread functions facilitates achieving a reasonably uniform light field (310-1) with relatively widely-spaced light emitters. In this example, the light emitters are spaced apart by a distance that is substantially equal to the full-width at half maximum of the point spread functions. FIG. 3C shows that suppressing tails (which comprises the tail 314-9 of the point spread function 302-9) of point spread functions facilitates achieving greater contrast between the darkest and brightest parts of the light field and achieving transitions from bright to dark over a shorter distance than otherwise. FIG. 3D illustrates effects of suppressing PSF tails on contrast ratios, in an example embodiment. For example, a light output profile may specify a light field comprising a target cross section in which light illumination should be maximally driven and other sections in which light illumination should be minimally driven. A PSF distribution curve (302-10) whose tail is more suppressed than a PSF distribution curve (302-11) generates a higher contrast ratio than that generated by the PSF distribution curve (302-11). However, the PSF distribution curve (302-11) may generate better uniformity of the light illumination in the target cross section than the PSF distribution curve (302-10). Determination as to which of the two PSF distribution curves is implemented may depend on whether the light output profile places more weight on realizing the uniformity of light illumination than on realizing the highest contrast ratio.

Under techniques as described herein, various types of optical components such as diffusers of different directionalities, reflectors, light redirection films, etc., may be used to shape central peaks and tails of point spread functions to satisfy illumination performance values specified in a light output profile.

5. High-Performance Display Light Design Process

Figure 4A:
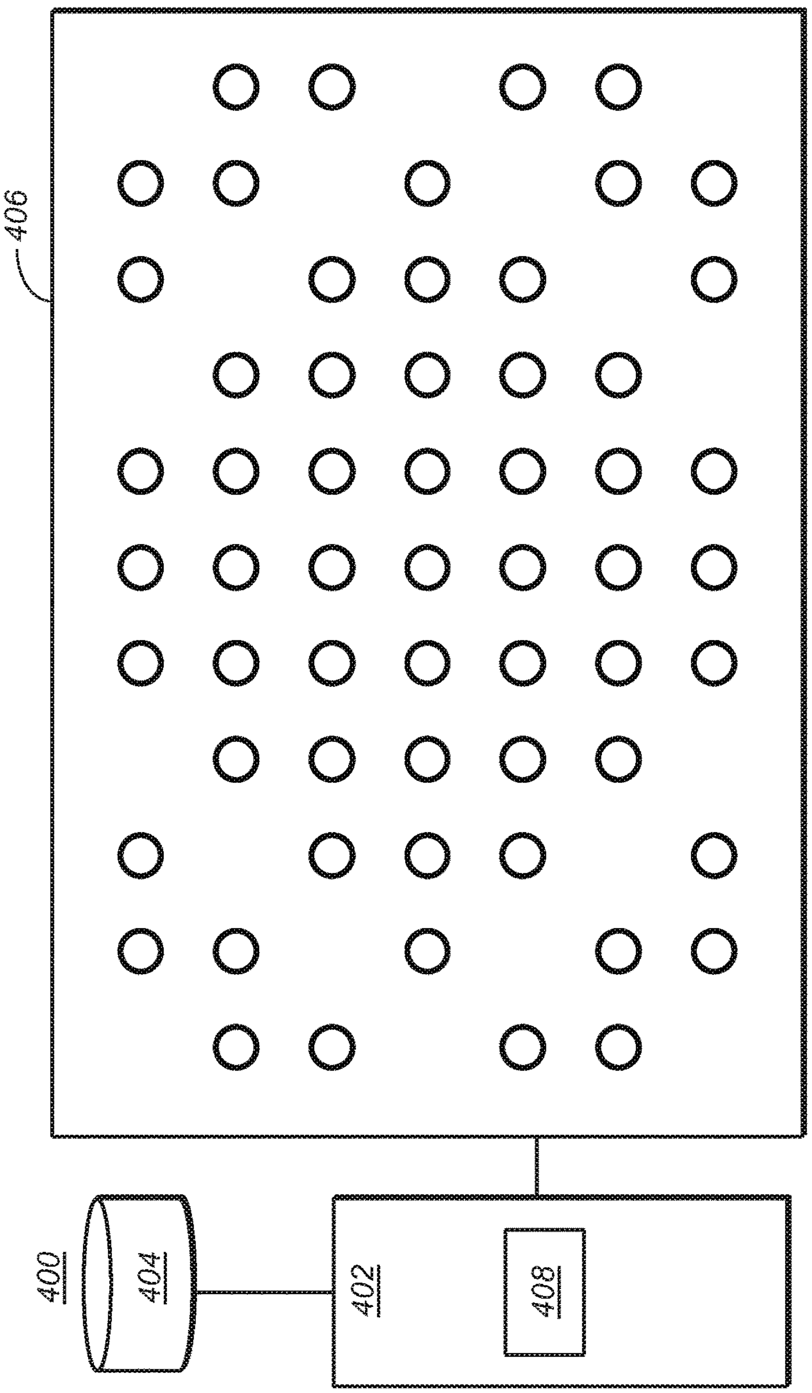
FIG. 4A illustrates a display light design system, in accordance with some example embodiments.
Figure 5A:
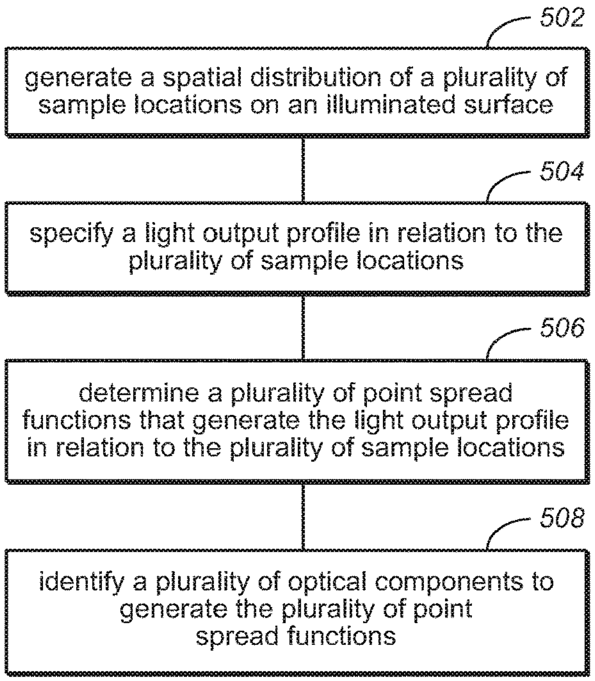
FIG. 5A and FIG. 5B illustrate process flows, according to some example embodiments.

FIG. 5A illustrates a process flow that may be used to accurately design high-performance light illumination for display devices, according to an example embodiment. In some embodiments, one or more computing devices, along with optical components, electronic components, sensors, or other components, may perform this process flow. In the following discussion, reference may also be made to FIG. 4A which illustrates a display light design system 400 comprising some of the components used to implement the process flow of FIG. 5A.

As shown in FIG. 4A, the display light design system 400 comprises a display light unit under design (406) and a control and test logic unit (402) that is operatively linked with the display light unit under design (406). The display light unit under design (406) may comprise an illuminated surface 100. The control and test logic unit (402) may be configured to retrieve optical parameter information of different types of optical components from a test and configuration database (404). The control and test logic unit (402) may be configured to retrieve test patterns from the test and configuration database (404). The control and test logic unit (402) may be configured to control active components in the display light unit under design (406) and may comprise a measurement unit (408) to measure and collect illumination information on the illuminated surface 100.

In block 502, the display light design system 400 generates a spatial distribution of a plurality of sample locations on the illuminated surface 100. The spatial distribution of sample locations may be programmatically created or manually created with user input.

In block 504, the display light design system 400 specifies a light output profile in relation to the plurality of sample locations.

In block 506, the display light design system 400 determines a plurality of point spread functions that generate the light output profile in relation to the plurality of sample locations.

In block 508, the display light design system 400 identifies a plurality of optical components to generate the plurality of point spread functions.

In some embodiments, as illustrated in FIG. 1A, the plurality of sample locations comprises an even distribution over the illuminated area (100). In some other embodiments, as illustrated in FIG. 1B, the plurality of sample locations comprises an uneven distribution over the illuminated area (100). For example, the plurality of sample locations may comprise sample locations more densely populated in one or more portions of the illuminated area (100) than other portions of the illuminated area (100).

As used herein, a sample location may be but is not required to be a single spatial point or a pixel. In some embodiments, at least one sample location in the plurality of sample locations comprises one or more of circular shapes, triangular shapes, quadrilateral shapes, pentagonal shapes, hexagonal shapes, a combination of different component shapes, and other geometric shapes.

The display light design system 400 may comprise light sensors placed near or at sample locations to measure various illumination parameters associated with the sample locations (100). These illumination parameters as measured by the sensors include, but are not limited to any of, maximum luminance values, minimum luminance values, average luminance values, dark levels, contrast ratios, relationships between specific illumination values and specific spatial locations, cutoff locations at which a point spread function transitions from a central peak to a tail, shapes of central peaks, shapes of tails, etc.

An illuminated area as described herein may be but is not required to be a rectangular area. In some embodiments, at least one of the runtime illuminated area or the rendering surface comprises one or more shapes and wherein the shapes conform, at least one of a circular aspect, a triangular aspect, a quadrilateral aspect, a pentagonal aspect, a hexagonal aspect, a combination of different component shape aspects, or another geometric shape aspect. For example, a rendering surface as described herein may be of a letter shape in which the interior region of the letter shape constitutes the rendering surface.

In some embodiments, the light output profile in relation to the plurality of sample locations specifies, for at least one sample location in the plurality of sample locations, one or more values of contrast ratios, illumination geometries, illumination uniformities, illumination intensities, dark levels, and other illumination performance characteristics. The light output profile may, but is not required to, specify the same illumination performance values for multiple sample locations up to all the sample locations. For example, the light output profile in relation to the plurality of sample locations specifies, for at least one other sample location in the plurality of sample locations, one or more other values of contrast ratios, illumination geometries, illumination uniformities, illumination intensities, dark levels, and other illumination performance characteristics; the one or more other values are different from the one or more values.

In some embodiments, the plurality of point spread functions represents a light field (e.g., 310-1 of FIG. 3B or 310-2 of FIG. 3C), on the illuminated surface (100 of FIG. 1A or FIG. 1B). The light field may be generated by the plurality of optical components comprising one or more of light emitters, diffusers, reflectors, reflection enhancement films, light directors, enhanced specular reflectors, light waveguides, quantum dots, light emitting diodes, lasers, prisms, optical films, optical polarizers, liquid crystal materials, metallic components, total reflection surfaces, air gaps, back light units, or side light units, brightness enhancement films, light converters, color filters, organic light emitting diodes, or other optical components.

In some embodiments, the plurality of optical components comprises at least one light emitter (e.g., 204 of FIG. 2A or 252 of FIG. 2B) having one or more component light emitters. In some embodiments, the plurality of optical components comprises at least one light emitter (e.g., 204 of FIG. 2A or 252 of FIG. 2B) emitting one or more colors. In an example, the plurality of optical components comprises at least one light emitter in association with, or which at least in part generates, an individual point spread function in the plurality of point spread functions. In another example, the plurality of optical components comprises at least one light emitter in association with, or which at least in part generates, two or more individual point spread functions in the plurality of point spread functions.

In some embodiments, the display light design system 400 determines a set of point spread functions for a light emitter in the plurality of optical components, wherein each point spread function in the set of point spread functions satisfies a set of illumination performance values specified in the light output profile; and selects one or more optimal point spread functions from the set of point spread functions as designated point spread functions for the light emitter. For example, point spread functions that have relatively flat central peaks and relatively short transitions from the central peaks to tails may be selected as the optimal point spread functions from the set of point spread functions each of which meets relevant illumination performance values in the light output profile.

In some embodiments, the display light design system 400 identifies one or more optical parameters that are associated with a specific type of optical component; and determines, based on the one or more optical parameters, whether one or more optical components of the specific type should be included in the plurality of optical components to generate the plurality of point spread functions. At least one of the one or more optical parameters may represent a runtime controllable parameter.

An optical component may be added to, or removed from, the display light unit under design (406) if the display light design system 400 determines that the optical component improves, or complicates, the display light unit in terms of meeting the illumination performance values specified in the light output profile.

The runtime (actual) point spread functions generated by the included optical components may deviate from the point spread functions analytically or numerically determined/derived from the light output profile. In some embodiments, the display light design system 400 determines a plurality of runtime point spread functions, for example, by measuring actual illumination information with test patterns such as checker patterns, or by taking measurements while turning one individual light emitter at one time. Additionally, optionally, or alternatively, one or more of the foregoing steps may be performed using simulations or numeric computations.

In some embodiments, the display light design system 400 determines, based on the plurality of runtime point spread functions, a runtime light output profile for the illuminated surface; determines a plurality of runtime controllable parameters for the plurality of optical components; and determines one or more relationships between the plurality of runtime controllable parameters and the runtime light output profile.

As used herein, a runtime light output profile may comprise settable illumination values in relation to various locations on a runtime illuminated surface of a display device (or system); here, a location on the runtime illuminated surface may comprise a sub-pixel, a pixel, or a group of contiguous pixels, etc.

6. Display Process Flow

Figure 4B:
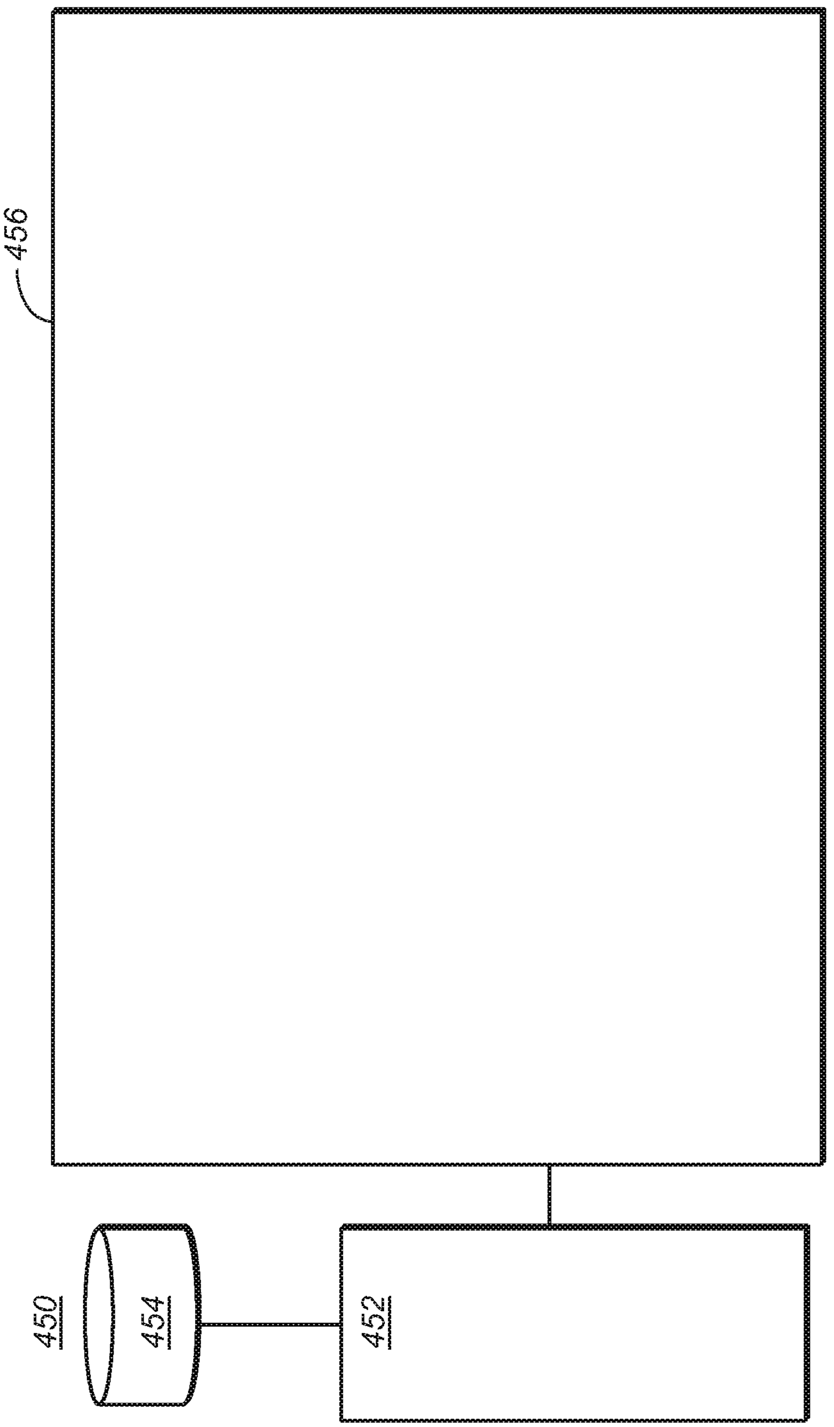
FIG. 4B illustrates a display device, in accordance with some example embodiments.
Figure 5B:
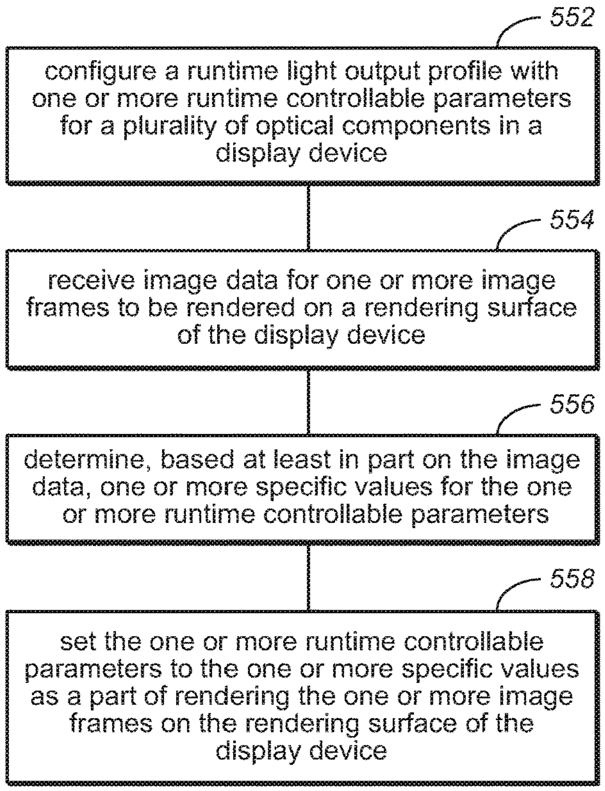

FIG. 5B illustrates a process flow that may be used to accurately generate high-performance light illumination for a display device, according to an example embodiment. In some embodiments, one or more computing devices, along with optical components, electronic components, sensors, or other components, may perform this process flow. In the following discussion, reference may also be made to FIG. 4B which illustrates a display device 450 comprising some of the components used to implement the process flow of FIG. 5B.

As shown in FIG. 4B, the display device 450 comprises a runtime display light unit (456) and a display and control logic unit (452) that is operatively linked with the runtime display light (456). The runtime display light unit (456) may comprise an illuminated surface 100. The display and control logic unit (452) may be configured to retrieve runtime controllable optical parameter information of different types of optical components from a display configuration database (454). The display and control logic unit (452) may be configured to retrieve image data one or more of a variety of image sources. The display and control logic unit (452) may be configured to control active components (e.g., individual light emitters) in the runtime display light unit (456). The display and control logic unit (452) may also be configured to select a light emitter control algorithm from multiple light emitter control algorithms to drive individual light emitters, for example, based on properties of a designated point spread function for a light emitter. A light emitter may be set to a state different from that of another light emitter in the display device 450.

In block 552, the display device 450 configures a runtime light output profile with one or more runtime controllable parameters for a plurality of optical components in the display device 450. The runtime light output profile may be generated for a runtime illuminated surface of the display device 450 based at least in part on a light output profile in relation to a plurality of sample locations on an illuminated surface of a display light design system (e.g., 400).

In block 554, the display device 450 receives image data for one or more image frames to be rendered on a rendering surface of the display device.

In block 556, the display device 450 determines, based at least in part on the image data, one or more values for the one or more runtime controllable parameters.

In block 554, the display device 450 sets the one or more runtime controllable parameters to the one or more values as a part of rendering the one or more image frames on the rendering surface of the display device.

In some embodiments, at least one of the runtime illuminated area and the rendering surface comprises one or more of circular shapes, triangular shapes, quadrilateral shapes, pentagonal shapes, hexagonal shapes, a combination of different component shapes, and other geometric shapes.

In some embodiments, the light output profile in relation to the plurality of sample locations specifies, for at least one sample location in the plurality of sample locations, one or more values of contrast ratios, illumination geometries, illumination uniformities, illumination intensities, dark levels, and other illumination performance characteristics.

In some embodiments, the light output profile in relation to the plurality of sample locations specifies, for at least one other sample location in the plurality of sample locations, one or more other values of contrast ratios, illumination geometries, illumination uniformities, illumination intensities, dark levels, and other illumination performance characteristics, wherein the one or more other values are different from the one or more values.

In some embodiments, the plurality of runtime point spread functions represents a runtime illumination field, on the illuminated surface, generated by the plurality of optical components comprising one or more of light emitters, diffusers, reflectors, reflection enhancement films, light directors, enhanced specular reflectors, light waveguides, quantum dots, light emitting diodes, lasers, prisms, optical films, optical polarizers, liquid crystal materials, metallic components, total reflection surfaces, air gaps, back light units, or side light units, brightness enhancement films, light converters, color filters, organic light emitting diodes, or other optical components.

In some embodiments, at least one light emitter in the plurality of optical components comprises one or more component light emitters. In some embodiments, at least one light emitter in the plurality of optical components emits one or more colors.

In some embodiments, the plurality of optical components comprises at least one light emitter in association with, or which at least in part generates, an individual runtime point spread function in the plurality of runtime point spread functions. In some embodiments, the plurality of optical components comprises at least one light emitter in association with, or which at least in part generates, two or more individual runtime point spread functions in the plurality of runtime point spread functions.

In some embodiments, the display device 450 configures one or more optimal point spread functions for a light emitter in the plurality of optical components. In some embodiments, an optimal point spread function as described herein is selected from a wide range of point spread functions that satisfy a set of illumination performance values specified in the light output profile in the display light design system 400. Selection of an optimal point spread function from multiple candidate point spread function may be based on central peak characteristics, tail characteristics, metrics such as contrast ratios or minimal visual artifacts, and/or other properties of point spread functions.

In some embodiments, the display device 450 selects one of the one or more optimal point spread functions to be used as a designated point spread function at a given time to render the one or more image frames on the rendering surface. The display device 450 may select a light emitter driving algorithm from multiple available driving algorithms to drive a light emitter based on properties of the designated point spread function.

The runtime light output profile may represent the actual light output profile generated by the plurality of optical components selected to satisfy illumination performance values of the light output profile in relation to a plurality of sample locations on the illuminated surface of the display light design system 400. A subset of values of the plurality of runtime (or actively) controllable parameters may provide a subset of runtime light output profiles each of which satisfies the illumination performance value of the light output profile, depending on how detailed the light output profile was specified in the display light design system 400.

One or more relationships between the plurality of runtime controllable parameters and the runtime light output profile may be ascertained in the display light design system 400, for example, by light-sensor-based measurements. In some embodiments, the display device 450 configures itself with the relationships between the plurality of runtime controllable parameters and the runtime light output profile; and sets the plurality of runtime controllable parameters to a plurality of runtime values based at least in part on the one or more relationships between the plurality of runtime controllable parameters and the runtime light output profile.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
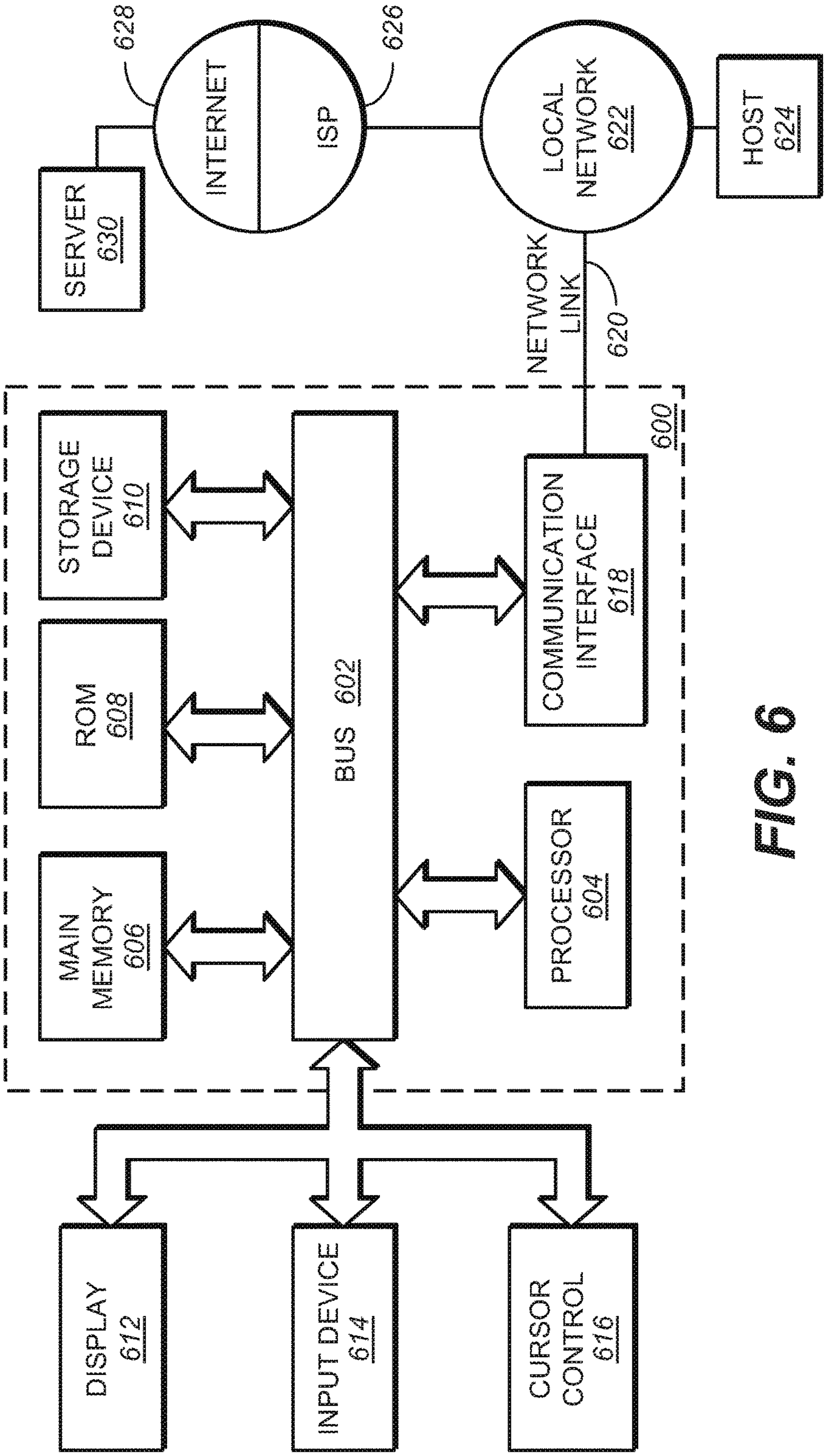
FIG. 6 illustrates a hardware platform on which a computer or a computing device as described herein may be implemented, according an example embodiment.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 625 might transmit a requested code for an application program through Internet 628, ISP 626, local network 622 and communication interface 618.

The received code may be executed by processor 604 as it is received, and/or stored in storage device 610, or other non-volatile storage for later execution.

8. Equivalents, Extensions, Alternatives and Miscellaneous

In the foregoing specification, embodiments of the invention have been described with reference to numerous particular details that may vary from implementation to implementation. Thus, the sole and exclusive indicator of what is the invention, and is intended by the applicants to be the invention, is the set of claims that issue from this application, in the particular form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Accordingly, the invention may be embodied in any of the forms described herein, including, but not limited to the following Enumerated Example Embodiments (EEEs) which described structure, features, and functionality of some portions of the present invention:

EEE1. A method, comprising:

generating a spatial distribution of a plurality of sample locations on an illuminated surface;

specifying a light output profile in relation to the plurality of sample locations;

determining a plurality of point spread functions that generate the light output profile in relation to the plurality of sample locations; and identifying a plurality of optical components to generate the plurality of point spread functions.

EEE2. The method of Claim 1, wherein the plurality of sample locations comprises an even distribution over the illuminated area.

EEE3. The method of Claim 1, wherein the plurality of sample locations comprises an uneven distribution over the illuminated area.

EEE4. The method of Claim 1, wherein the plurality of sample locations comprises sample locations densely populated in one or more portions of the illuminated area.

EEE5. The method of Claim 1, wherein at least one sample location in the plurality of sample locations comprises one or more of circular shapes, triangular shapes, quadrilateral shapes, pentagonal shapes, hexagonal shapes, a combination of different component shapes, and other geometric shapes.

EEE6. The method of Claim 1, wherein the illuminated area comprises one or more of circular shapes, triangular shapes, quadrilateral shapes, pentagonal shapes, hexagonal shapes, a combination of different component shapes, and other geometric shapes.

EEE7. The method of Claim 1, wherein the light output profile in relation to the plurality of sample locations specifies, for at least one sample location in the plurality of sample locations, one or more illumination performance values relating to contrast ratios, illumination geometries, illumination uniformities, illumination intensities, dark levels, and other illumination performance characteristics.

EEE8. The method of Claim 7, wherein the light output profile in relation to the plurality of sample locations specifies, for at least one other sample location in the plurality of sample locations, one or more other illumination performance values, and wherein the one or more other illumination performance values are different from the one or more illumination performance values.

EEE9. The method of Claim 1, wherein the plurality of point spread functions in aggregate represents a light field, on the illuminated surface, generated by the plurality of optical components, wherein the optical components comprises one or more of light emitters, diffusers, reflectors, reflection enhancement films, light directors, enhanced specular reflectors, light waveguides, quantum dots, light emitting diodes, lasers, prisms, optical films, optical polarizers, liquid crystal materials, metallic components, total reflection surfaces, air gaps, back light units, or side light units, brightness enhancement films, light converters, color filters, organic light emitting diodes, or other optical components.

EEE10. The method of Claim 1, wherein the plurality of optical components comprises at least one light emitter having one or more component light emitters.

EEE11. The method of Claim 1, wherein the plurality of optical components comprises at least one light emitter emitting one or more colors.

EEE12. The method of Claim 1, wherein the plurality of optical components comprises at least one light emitter in association with an individual point spread function in the plurality of point spread functions.

EEE13. The method of Claim 1, wherein the plurality of optical components comprises at least one light emitter in association with two or more individual point spread functions in the plurality of point spread functions.

EEE14. The method of Claim 1, further comprising:

determining a set of point spread functions for a light emitter in the plurality of optical components, wherein each point spread function in the set of point spread functions satisfies a set of illumination performance values specified in the light output profile; and selecting one or more optimal point spread functions from the set of point spread functions as designated point spread functions for the light emitter.

EEE15. The method of Claim 1, further comprising:

receiving one or more optical parameters that are associated with a specific type of optical component; and determining, based on value ranges of the one or more optical parameters, whether one or more optical components of the specific type should be included in the plurality of optical components to generate the plurality of point spread functions.

EEE16. The method of Claim 15, wherein the one or more optical parameters comprises at least one runtime controllable parameter.

EEE17. The method of Claim 1, further comprising determining a plurality of runtime point spread functions.

EEE18. The method of Claim 17, further comprising:

determining, based on the plurality of runtime point spread functions, a runtime light output profile for the illuminated surface;

identifying a plurality of runtime controllable parameters for the plurality of optical components; and determining one or more relationships between values of the plurality of runtime controllable parameters and the runtime light output profile.

EEE19. A method, comprising:

configuring a runtime light output profile with one or more runtime controllable parameters for a plurality of optical components in a display device, wherein the runtime light output profile are generated for a runtime illuminated surface of the display device based at least in part on a light output profile, which is specified in relation to a plurality of sample locations on an illuminated surface of a display light design system;

receiving image data for one or more image frames to be rendered on a rendering surface of the display device;

determining, based at least in part on the image data, one or more specific values for the one or more runtime controllable parameters; and setting the one or more runtime controllable parameters to the one or more specific values; and rendering the one or more image frames on the display device rendering surface based on the set specific values for the run time controllable parameters.

EEE20. The method of Claim 19, wherein at least one of the runtime illuminated area or the rendering surface comprises one or more shapes and wherein the shapes conform, at least one of a circular aspect, a triangular aspect, a quadrilateral aspect, a pentagonal aspect, a hexagonal aspect, a combination of different component shape aspects, or another geometric shape aspect.

EEE21. The method of Claim 19, wherein the light output profile in relation to the plurality of sample locations specifies, for at least one sample location in the plurality of sample locations, one or more illumination performance values, wherein the illumination performance values relate to contrast ratios, illumination geometries, illumination uniformities, illumination intensities, dark levels, or other illumination performance characteristics.

EEE22. The method of Claim 21, wherein the light output profile in relation to the plurality of sample locations specifies, for at least one other sample location in the plurality of sample locations, one or more other illumination performance values, and wherein the one or more other illumination performance values differ from the one or more illumination performance values.

EEE23. The method of Claim 19, wherein the plurality of runtime point spread functions represents a runtime illumination field, on the illuminated surface, which is generated by the plurality of optical components, wherein the optical components comprise one or more of light emitters, diffusers, reflectors, reflection enhancement films, light directors, enhanced specular reflectors, light waveguides, quantum dots, light emitting diodes, lasers, prisms, optical films, optical polarizers, liquid crystal materials, metallic components, total reflection surfaces, air gaps, back light units, side light units, brightness enhancement films, light converters, color filters, organic light emitting diodes, or another optical component.

EEE24. The method of Claim 19, wherein the plurality of optical components comprises at least one light emitter having one or more component light emitters.

EEE25. The method of Claim 19, wherein the plurality of optical components comprises at least one light emitter emitting one or more colors.

EEE26. The method of Claim 19, wherein the plurality of optical components comprises at least one light emitter in association with an individual runtime point spread function in the plurality of runtime point spread functions.

EEE27. The method of Claim 19, wherein the plurality of optical components comprises at least one light emitter in association with two or more individual runtime point spread functions in the plurality of runtime point spread functions.

EEE28. The method of Claim 19, further comprising:

configuring one or more optimal point spread functions for a light emitter in the plurality of optical components, wherein each optimal point spread function of the one or more optimal point spread functions satisfies a set of illumination performance values specified in the light output profile; and setting the one or more runtime controllable parameters to the one or more specific values; and rendering the one or more image frames on the display device rendering surface based on the set specific values for the run time controllable parameters.

EEE29. The method of Claim 19, further comprising:

configuring one or more relationships between values of the plurality of runtime controllable parameters and the runtime light output profile; and setting the plurality of runtime controllable parameters to a plurality of runtime values based at least in part on the one or more relationships between values of the plurality of runtime controllable parameters and the runtime light output profile.

EEE30. An apparatus comprising a processor and configured to perform the method recited in any of the methods of Claims 1 to 28.

EEE31. A computer readable storage medium, comprising software instructions, which when executed by one or more processors cause performance of the methods recited in any of the methods of Claims 1 to 28.

EEE32. A computing device comprising one or more processors and one or more storage media storing a set of instructions which, when executed by the one or more processors, cause performance of any of the methods of Claims 1 to 28.

What is claimed is:

1. A display system comprising:

a first light modulation layer including an input coupled to receive first control data and a light valve operative to modulate a lightfield incident thereon based on said first control data;

a second light modulation layer including an input coupled to receive second control data and an illumination layer operative to provide light, said second light modulation layer being operative to redirect said light from said illumination layer to generate said lightfield incident on said first light modulation layer based on said second control data; and a controller coupled to receive image data and operative to provide said first control data to said first light modulation layer and said second control data to said second light modulation layer based on said image data.

2. The display system of claim 1, wherein said display system includes (N) light modulation layers, (N) being an integer greater than 1.

3. The display system of claim 2, wherein said display system is a dual modulation display system.

4. The display system of claim 2, wherein said second modulation layer includes a light redirector operative to provide more than one point spread function from a single emitter of said illumination layer.

5. The display system of claim 2, wherein said second modulation layer includes a second light valve and is operative to provide more than one point spread function from a single emitter of said illumination layer.

6. The display system of claim 2, wherein:

said controller provides said first control data to said first light modulation layer based at least in part on said image data corresponding to a first spatial resolution; and said controller provides said second control data to said second light modulation layer based at least in part on said image data corresponding to a second spatial resolution coarser than said first spatial resolution.

7. The display system of claim 1, wherein:

said second modulation layer includes a light redirector operative to provide more than one point spread function from a single emitter of said illumination layer; and said controller actively controls said light redirector at runtime based on runtime controllable parameters.

8. The display system of claim 1, wherein:

said second modulation layer includes a second light valve and is operative to provide more than one point spread function from a single emitter of said illumination layer; and said controller actively controls said second modulation layer at runtime based on runtime controllable parameters.

9. The display system of claim 1, wherein:

said second modulation layer includes a light redirector operative to provide more than one point spread function from a single emitter of said illumination layer;

said controller is operative derive said first control data and said second control data from said image data;

said first control data corresponds to a first spatial resolution of said image data; and said second control data corresponds to a second spatial resolution of said image data coarser than said first spatial resolution of said image data.

10. The display system of claim 1, wherein said second light modulation layer includes a second light valve operative to redirect portions of said light from said illumination layer to generate more than one new point spread function in said light field based on said second control data.

11. The display system of claim 10, wherein said second light valve includes a liquid crystal material.

12. The display system of claim 10, wherein said second light modulation layer includes a plurality of reflectors.

13. The display system of claim 12, wherein said reflectors are actively controlled at runtime at least in part by said second control data provided by said controller.

14. The display system of claim 1, wherein:

said second modulation layer includes a light redirector operative to redirect light from said illumination layer to provide a plurality of runtime point spread functions in said light field based on said second control data;

said controller is configured to determine a runtime illumination field based at least in part on said runtime point spread functions; and said runtime illumination field corresponds to said lightfield.

15. A method of displaying image data, said method comprising:

receiving illumination light from a light source, said illumination light being characterized by a first set of point spread functions;

receiving first control data based on received image data;

redirecting portions of said illumination light based at least in part on said first control data to generate a light field, said light field including more than one new point spread functions resulting from the redirection of a single point spread function of said illumination light;

receiving second control data based on said received image data; and modulating said light field based at least in part on said second control data to generate an image to be displayed.

16. The method of claim 15, wherein said step of redirecting portions of said illumination light is accomplished with a light valve.

17. The method of claim 15, wherein said step of redirecting portions of said illumination light is accomplished with a liquid crystal material.

18. A display system comprising:

a first light modulation layer including in input coupled to receive first control data and a light valve operative to modulate a lightfield incident thereon based on said first control data;

a second light modulation layer including an input coupled to receive second control data and an illumination layer operative to provide light, said second light modulation layer including means for redirecting said light from said illumination layer to generate said lightfield incident on said first light modulation layer based on said second control data, said means for redirecting generating multiple point spread functions is said light field from a single point spread function in said light from said illumination layer; and a controller coupled to receive image data and operative to provide said first control data to said first light modulation layer and said second control data to said second light modulation layer based on said image data.

19. The display system of claim 18, wherein said means for redirecting said light from said illumination layer includes a light valve.

20. The display system of claim 18, wherein said means for redirecting said light from said illumination layer includes a liquid crystal material.

* * * * *